United States Patent
Tang et al.

(10) Patent No.: US 10,148,529 B2
(45) Date of Patent: Dec. 4, 2018

(54) APPARATUS OF MAPPING LOGICAL POINT-OF-DELIVERY TO PHYSICAL POINT-OF-DELIVERY BASED ON TELECOMMUNICATION INFORMATION NETWORKING

(75) Inventors: Changbin Tang, Shanghai (CN); Qin Zhu, Shanghai (CN)

(73) Assignee: Transoft (Shanghai), Inc., Shanghai (CN)

( * ) Notice: Subject to any disclaimer, the term of this patent is extended or adjusted under 35 U.S.C. 154(b) by 531 days.

(21) Appl. No.: 14/123,828

(22) PCT Filed: Sep. 7, 2012

(86) PCT No.: PCT/CN2012/081106
§ 371 (c)(1),
(2), (4) Date: Sep. 16, 2014

(87) PCT Pub. No.: WO2014/036716
PCT Pub. Date: Mar. 13, 2014

(65) Prior Publication Data
US 2015/0172136 A1 Jun. 18, 2015

(51) Int. Cl.
*H04L 12/24* (2006.01)

(52) U.S. Cl.
CPC .......... *H04L 41/5054* (2013.01); *H04L 41/00* (2013.01)

(58) Field of Classification Search
CPC .... G06F 9/455–9/45545; G06F 9/5072; H04L 41/00–41/5058; H04L 67/10–67/12
See application file for complete search history.

(56) References Cited

U.S. PATENT DOCUMENTS

| | | | | |
|---|---|---|---|---|
| 6,728,267 B1 * | 4/2004 | Giese | ..................... | H04L 29/06 370/469 |
| 7,948,968 B2 * | 5/2011 | Voit | ........................ | H04L 12/14 370/352 |

(Continued)

FOREIGN PATENT DOCUMENTS

| | | | | |
|---|---|---|---|---|
| CN | 102103518 A | * | 6/2011 | ......... G06F 9/45545 |
| CN | 101808139 B | * | 4/2013 | |
| CN | 102468975 B | * | 9/2014 | |

*Primary Examiner* — Clayton R Williams
(74) *Attorney, Agent, or Firm* — Occhiuti & Rohlicek LLP

(57) ABSTRACT

The present invention discloses an apparatus of mapping logical point-of-delivery to physical point-of-delivery, which is capable of maintaining the completeness and consistency of each project's point-of-delivery environment within a corporate data center by utilizing session mechanisms in each layer of the TINA-variation architecture. The apparatus of the present invention is based on a new TINA-variation architecture, which vertically includes four session layers: Access Session Layer, Service Session Layer, Resource Session Layer, and Provision Session Layer. Resource Session Layer and Provision Session Layer are among the innovative features of the present invention. The service target of the new architecture is enterprise data center. The new architecture is left-right asymmetrical; it horizontally includes Project Developer Domain, Resource Provision Domain, and Application User Domain. The resources it involves are extended from network connection resource covered by standard TINA, to all assets under management in enterprise data center, including network, storage, and computing resources.

5 Claims, 7 Drawing Sheets

(56) References Cited

U.S. PATENT DOCUMENTS

| | | | | |
|---|---|---|---|---|
| 9,043,747 | B2* | 5/2015 | Eksten | G06F 8/70 709/219 |
| 9,161,087 | B2* | 10/2015 | Katz | H04N 7/17318 |
| 9,342,368 | B2* | 5/2016 | Sahu | G06F 8/61 |
| 2005/0143067 | A1* | 6/2005 | Van Do | G06F 17/30867 455/432.3 |
| 2010/0223378 | A1* | 9/2010 | Wei | H04L 41/0896 709/224 |
| 2011/0126197 | A1* | 5/2011 | Larsen | H04L 9/3213 718/1 |
| 2011/0131335 | A1* | 6/2011 | Spaltro | G06F 9/5072 709/228 |
| 2012/0072985 | A1* | 3/2012 | Davne | H04L 63/0272 726/22 |
| 2013/0121207 | A1* | 5/2013 | Parker | H04L 67/10 370/254 |

* cited by examiner

APPARATUS OF MAPPING LOGICAL POINT-OF-DELIVERY TO PHYSICAL POINT-OF-DELIVERY BASED ON TELECOMMUNICATION INFORMATION NETWORKING

CROSS REFERENCE TO RELATED APPLICATION

This application is the national phase under 35 USC 371 of international application no. PCT/CN2012/081106, filed Sep. 7, 2012. The contents of the aforementioned applications are incorporated herein in their entirety.

FIELD OF THE INVENTION

The present invention relates to a mapping apparatus, which leverages TINA (Telecommunication Information Networking Architecture, origins from the telecommunication service industry) and then modifies and adjusts it into a new TINA-variation architecture. The new architecture is applicable to the cloud computing resource management, and no longer suitable to the telecommunication service industry where TINA origins from. Specifically, this novel TINA-variation architecture is horizontally asymmetrical, and has four session layers vertically. While work together, they can map logical point-of-delivery to physical point-of-delivery. With session mechanisms, the architecture is capable of maintaining the completeness and consistency of each project's point-of-delivery environment within a corporate data center after the mapping process.

BACKGROUND

From a common user's viewpoint, cloud computing offers "unlimited" computing, storage, and network capacities. However, providing "unlimited" capacities is neither practical nor attainable. In fact, suppliers must be able to build their infrastructure in a linear and consistent way to meet cloud users' growing infrastructure demand and optimize the usage. This linear growth can be achieved through point-of-delivery. A point-of-delivery is "a network service module composed of network, computing, storage, and application components". It is also a design pattern which can be implemented and duplicated to maximize modularity, scalability, and manageability of a data center. The difference between point-of-delivery and the other design patterns is that it is a deployable module. This module provides "services", and all components inside the module share one and the same failure domain. In other words, if a failure occurs inside one point-of-delivery, it may only affect the projects within the point-of-delivery, and will not affect the projects outside the point-of-delivery.

The concept of point-of-delivery was first proposed by Cisco. It represents a type of fast-deployable, fast-deliverable construction module, which includes the technologies of service, security, networking, management, software virtualization, and data center interconnection. A point-of-delivery can be constructed through different types of ways. First of all it shall have a definition, namely a point-of-delivery is a duplicable physical environment, including computing, network, and application resources, etc. The most important feature of a point-of-delivery is all virtualized applications can migrate freely within it, avoiding so-called the routing-layer obstacle. For different users, point-of-delivery designs may vary, it may include all aggregation switches under a core switch inside a data center; it may be a little smaller in scale. In the former case, the entire system may achieve higher efficiency; applications can acquire resources to run freely inside a larger cluster of computers, but certainly the design itself is not very flexible. If a point-of-delivery needs 2,000 square-meter rooms, then a 1,000 square-meter room next to it will not be utilized. In the latter case, a relatively small point-of-delivery will be more flexible, but resource utilization efficiency will not go very high, since the resource scheduling is only operated in a small scale. Point-of-delivery provided by service provider's infrastructure is particularly important, for example: in a cloud computing service supported data center, point-of-delivery can help it to maintain scalability while its workloads/data volume is increasing.

The main objective of the present invention is to improve resource utilization efficiency by dynamically scheduling resources within small-scale point-of-delivery. In the present invention, point-of-delivery can be classified as logical one or physical one. Logical point-of-delivery refers to the combination of logical resources of computing, network, and storage that user's business project required. They are "subscribed" through user's specification, according to which the resources can be shared by space or by time. Physical point-of-delivery is a physical provisioning unit of datacenter network equipment through a set of resource definition and classification. The unit can work independently, and is considered as deliverable unit of resource services. That means, the basic unit of resource provisioning, is not a single physical server, a virtual server or a virtual switch, but a (meaningful) "set" of these resources. Here is a metaphor to describe the relationship between logical and physical point-of-delivery: a logical point-of-delivery is like booking a Chinese wedding banquet, the specification of which includes how many round tables for the wedding banquet, how many seats for each table, as well as how many dishes for each table, etc; the physical point-of-delivery is the actual wedding banquet where the guests and hosts enjoy the feast. The term point-of-delivery defined by Cisco actually refers to the physical point-of-delivery only. The distinction between logical and physical point-of-delivery, particularly the process of mapping the logical point-of-delivery to physical point-of-delivery is one of the major contributions of the present invention.

It's noteworthy that logical point-of-delivery has following features:

(1) A logical point-of-delivery often contains multiple "virtual servers". "Virtual Server" means server virtualization or abstraction of a physical server, which is considered as a type of logical resource. Virtual servers are allowed to over-subscribe a physical (host) server by sharing its space or time. Software running on a physical host server to achieve space or time sharing is called "hypervisor". On a physical host server, each virtual server has its own hardware specification, and runs independent of each other. Physical host server is invisible not only to provisioning instances of logical point-of-delivery, but also application users.

(2) Besides virtual server's hardware specification can be provisioned on-demand, virtual server's operating system can also be provisioned on-demand.

(3) Besides virtual server's operating system can be provisioned on-demand, application server (software) can also be provisioned on-demand on each over-subscribed operating system.

The present invention focuses on (1). The relationship between logical and physical resources can be summarized as following: from a business project to a logical point-ofdelivery is a one-to-one mapping process; from logical point-of-delivery to physical point-of-delivery is a multiple-to-multiple mapping process. By subscribing the logical resources in a logical point-of-delivery, a project developer thus in further subscribes distributed physical resources of the physical point-of-delivery.

There are eight related patents listed below. Through brief introductions and comparison, the present invention displays novelty and creativity in following two aspects: distinguishing logical point-of-delivery from physical point-of-delivery, and proposing the method of mapping logical point-of-delivery to physical point-of-delivery; with session mechanisms, it is capable of maintaining the completeness and consistency of each project's point-of-delivery environment after the mapping processes.

(1) patent CN101398768A "Construct Method of Distributed Virtual Machine Monitor System", by using the "latest" virtualization technology between hardware and operating system, deploys and constructs distributed virtual machine monitor system DVMM on multiple physical nodes. DVMM consolidates and virtualizes multiple computer resources and turns them into virtual resources, and unifies the management of these resources. According to application requirements, it can either integrate multiple computer resources into a single virtual machine in order to meet the resource requirements of some super computation task; or create multiple virtual machines on one computer to consolidate multiple small-scale applications onto a single machine, in order to improve resource utilization efficiency. This patent only involves server (i.e. computing resource) virtualization, but not concerns with storage resource and network resource virtualization. And the system structure is relatively simple.

(2) Patent CN101938416A "Cloud Computing Resource Scheduling Method Based on Dynamic Reconfiguration of Virtual Resources", according to the loading information of the cloud applications collected by cloud application monitor, is able to dynamically reconfigure virtual resources, based on the loading capacity of the virtual resources and current loading volume of the cloud applications.

(3) Patent CN102170474A "Dynamic Scheduling Method and System for Virtual Resources in the Cloud Computing Network", uses a live migration method to achieve dynamic virtual resource scheduling, dynamic load balancing, and high utilization efficiency of virtual resources through effective load balancing.

The "virtual resources" in Patent (2) and (3) only refer to virtual machines; and the "physical resources" refers to related CPU, memory, and storage (disks). While these two patents concern with virtual resource scheduling, virtual resources being scheduled only refer to computing resources, and do not involve storage and network resources.

(4) Patent CN102291445A "Cloud Computing Management System Based on Virtualized Resources", by using B/S (Brower/Server) architecture and virtual machine technology, allows user to rent virtual machines on-demand through self-service at any place any time. It supports customized configuration of virtual machines, and helps user to use resources more effectively.

The virtual resources in Patent (4) include underlying virtual resource pool, virtual machine management modules, virtual machine server modules, and virtual machine storage modules. The patent involves server (computing resource) and storage resource virtualization, but not network resource virtualization.

(5) Patent US20080082983A1 "Method and System for Provisioning of Resources" contemplates a method of autonomous provisioning of resources of a computer system, wherein performance-critical workload of the computer system is monitored; workload suffering is detected based on comparing the performance-critical workload with defined values of performance-critical workload goals; types of missing resources are determined; additional resources available for activation are determined; the additional resources are activated, and a notification of the activation is generated for being sent to a system provider, e.g. for automated billing of the added capacity.

Patent (5) includes "(optional) virtual hardware platform." The virtual hardware platform only refers to virtual machines (see FIG. 1 of patent US 20080082983A1). As the virtual hardware platform is "optional", which means the system is able to work properly without virtual machines, virtualization is not the critical technology to achieve autonomous provisioning of resources of a computer system. Obviously it is quite different from the present invention, which uses virtualization as the key technology for mapping logical point-of-delivery to physical point-of-delivery.

(6) Patent CN102292698A and Patent US20100198972A1 basically have the same content: "Methods and Systems for Automated Management of Virtual Resources in a Cloud Computing Environment". The applicant of these two patents is Citrix Systems Inc. They describe a virtual resources management system in cloud computing environments, including a host computing device communication component and a storage system communication component. The storage system communication component is executed by a storage delivery management service, communicates with a storage system adapter in a storage area network to identify a storage system in a storage area network, and directs the automated provisioning of a virtual storage resource on the identified storage system.

The "virtual resources" in Patent (6) refer to virtual storage resources only, and do not include computing resources and network resources in the cloud computing environment. The present invention involves the management of computing, storage, and network resources, which is quite different from Patent (6).

In brief, the main difference between the present invention and Patent (1)-(6) lies in the following three aspects:
1) The present invention not only involves the computing resource (server) virtualization, but also storage resource and network resource virtualization.
2) The present invention does not manage resources by the unit of single physical resource or virtual resource, but orchestrates the computing, storage, and network resources with unified scheduling based on the unit of point-of-delivery.
3) The objective of the present invention is how to maintain the completeness and consistency of each project's point-of-delivery environment within a corporate data center during the processes of mapping the logical point-of-delivery to the physical point-of-delivery; rather than focusing on the details of mapping process (that's beyond the scope of the present invention).

(7) Patent CN102347959A "System and Method of Resource Access System Based on Identity and Session". The main objective is maintaining the identities of resource, service provider, session, and application during the resource access processes by session mechanisms.

Based on Patent (7), the present invention clarifies the relationships between various sessions, and proposes a new TINA-variation four-layer architecture, which uses session mechanisms to maintain the integrity and consistency of the point-of-delivery environments.

(8) Patent EP1091599A1 "Method for Accessing a Service Platform Such As TINA via an Internet Browser Session" describes the method of accessing a service platform such as TINA through an Internet browser session. With TINA service platform and the session mechanisms of TINA, it provides the mean to identify bilaterally the service provider and the service consumers and users, and a consistent way to identify a user, and provide the ability to subscribe, tailor, manage, and/or account his preferred services. In the end the user may access the service session via the browser session.

The concepts of service provider, service consumer, and user in Patent (8) are limited to the field of Internet. The TINA-variation architecture described by the present invention is applied to the cloud computing resource management in a corporate data center. The service target of the architecture is not simple B/S (Brower/Server) architecture systems anymore, but a variety of cloud computing resources, which is a big difference. The TINA architecture has been modified to a great extent; please see following sections for the details.

SUMMARY

As the goals mentioned above, the embodiment of the present invention is a service delivery platform, which is able to map logical point-of-delivery to physical point-of-delivery. It is capable of maintaining the completeness and consistency of each project's point-of-delivery environment within a corporate data center by utilizing session mechanisms in each layer of the TINA-variation architecture The technology solution of the present invention is as follows. The present invention discloses an apparatus of mapping logical point-of-delivery to physical point-of-delivery for cloud computing resource management in an enterprise data center. The embodiment of the apparatus is a service delivery platform. The apparatus is based on a new TINA-variation architecture. The service target of the TINA-variation architecture is enterprise data center. The TINA-variation architecture vertically includes Access Session Layer, Service Session Layer, Resource Session Layer, and Provision Session Layer. The TINA-variation architecture is left-right asymmetrical. The resources of the TINA-variation architecture are IT resource, storage resource, and network resource. The service delivery platform mentioned above is used by project developer, project operator, application user, and system operator. The service delivery platform includes:

Project Delivery Service Network: includes Project Core Service, Project Design Service, Project Delivery Scheduling, and Project Subscription Service;

Project Logical Environment Service Network: in which the project-delivery-and-scheduling function supports automatic or manual offline-online environment switching, and supports scheduling multiple sets of project's point-of-delivery. Project Logical Environment Service Network includes multiple sets of offline-project's and online-project's logical point-of-delivery.

Project Logical Environment Storage Network: includes multiple sets of offline-project instance's point-of-delivery;

Project Logical Environment Resource Network: includes multiple sets of online-project instance's point-of-delivery;

Virtual Resource Network: in which virtual resources aggregate physical resources of different configurations and different locations, to achieve resource consolidation regardless of types and deployments of the physical resources. Including unallocated and allocated virtual resources, Virtual Resource Network provides support (functions) of exclusive holding or sharing virtual resources.

Data Center Physical Resource Service Network Divided by Project: includes multiple sets of physical point-of-delivery. The Data Center Physical Resource Service Network Divided by Project supports subscription and commitment (i.e., delivery) of point-of-delivery, and supports sharing physical resources by space or by time. Data Center Physical Resource Service Network Divided by Project includes unallocated and allocated physical resources.

In one embodiment of the present invention, an apparatus of mapping the logical point-of-delivery to the physical point-of-delivery is provided, wherein the TINA-variation architecture includes several session-related service components in the service delivery platform. These service components are distributed in Project Development Domain, Resource Provision Domain, and Application User Domain. Project Development Domain and Application User Domain contain all instantiated components at developer/operator/user terminal. Resource Provision Domain contains all instantiated components and resources at one or several resource provision points in the network.

In one embodiment of the present invention, an apparatus of mapping the logical point-of-delivery to the physical point-of-delivery is provided, wherein the Access Session Layer includes following access session related components:

An Access Session Developer-Operator (component): is used to create a new session; in the session, the project developer plans a logical point-of-delivery, while he/she obtains the project-specific resource requirements. The project operator schedules the activate time, the moment when the project's logical point-of-delivery maps to the physical point-of-delivery;

An Access Session Application User (component): by which user joins a session, find his/her point-of-delivery, and then the user can use his/her resources;

Two Provider Agent (components): help Project developer/project operator/application user to establish trust relationships among them; send project-operator request to Developer-Operator Agent to establish new session; or receive an invitation from User Agent for application user. Each occurrence of access session will generate a Provider Agent instance;

Two Initial Agent (components): are components independent of project developer, project operator, and application user. They are the initial access points in Resource Provision Domain. When project developer, project operator or application user try to contact or create session with component in Resource Provision Domain, Initial Agent will reply a message to Provider Agent. By interacting with Provider Agent, Initial Agent supports identity authentication and trust-relationship establishment between project developer/project operator/application user and Resource Provision Domain;

A Developer-Operator Agent (component): is on behalf of project developer or project operator in Resource Provision Domain, acts as a single contact point in access session, to control and manage new project's Operator Service Session Manager. Contact information between project developer/project operator and Resource Provision Domain can be obtained from Developer-Operator Agent as well;

A User Agent (component): is on behalf of application user in Resource Provision Domain, acts as a single contact point in access session, to control and manage new User Service Session Manager. Contact information between application user and Resource Provision Domain can be obtained from User Agent as well;

A Subscription Management Component: provides the management function of subscription-service information model in Resource Provision Domain.

In one embodiment of the present invention, an apparatus of mapping the logical point-of-delivery to the physical point-of-delivery is provided, wherein the Service Session Layer includes following service session related components:

A Service Session Project Operator (component): is a project-operator-related service component, acts as a concrete service endpoint. Through some proper interface, it allows project operator to access to Operator Service Session Manager, it also supports general service session control capabilities. For each service session involving this component, it will interact with Operator Service Session Manager;

A Service Session Application User (component): is an application-user-related service component, acts as a concrete service endpoint. Through some proper interface, it allows application user to access to User Service Session Manager, it also supports general service session control capabilities. For each service session involving this component, it will interact with User Service Session Manager;

A Service Factory (component): is a specific-service-related service component, used to create an object instance, upon the request from Developer-Operator Agent or User Agent. If an application user requests to create instance, it must have an interface being able to access to Service Facility, and it shall send a proper request. A Service Factory of multi-service-type provides individual interfaces for each type of the services separately. If necessary, Service Factory can continue to manage the service components it generated;

A Service Session Manager (component): is used to control service session. It supports service capabilities shared by multiple application users in the session. In service session, Service Session Manager supports to track and control virtual resource operations, it also supports the management capacities related to service session. Service Session Manager is instantiated by the Service Factory, which generates a Service Session Manager upon request. When project developer leaves services session or Service Session Manager is terminated by Service Factory, Service Session Manager instance will be deleted;

An Operator Service Session Manager (component): holds local project-operator-related performance data and information. If an operation only involves local project operator, Operator Service Session Manager will use its control and management capabilities; otherwise, Operator Service Session Manager and Service Session Manager will work together to support the operation. Operator Service Session Manager is instantiated by Service Factory, which generates an Operator Service Session Manager upon request. When project operator leaves the session, Operator Service Session Manager instance will be deleted;

An Application User Session Manager (component): holds local application user related performance data and information. If an operation only involves local application user, Application User Session Manager will use its control and management capabilities; otherwise, Application User Session Manager and Service Session Manager will work together to support the operation. Application User Session Manager is instantiated by Service Factory, which generates an Application User Session Manager upon request. When application user leaves the session, Application User Session Manager Instance will be deleted;

In the embodiment of the present invention, an apparatus of mapping the logical point-of-delivery to the physical point-of-delivery is provided, wherein the Resource Session Layer includes one resource session related component:

A Resource Session Manager (component): manages end-to-end resource provision, provides an interface which allows User Service Session Manager, Operator Service Session Manager, and Service Session Manager to create, modify, and delete end-to-end resource provision.

In one embodiment of the present invention, an apparatus of mapping the logical point-of-delivery to the physical point-of-delivery is provided, wherein Provision Session Layer includes following provision session related components:

A Provision Coordinator (component): coordinates low level physical resources;

A Provision Coordinator Factory (component): is used to create provision-coordinator-object instance. A Provision Coordinator Factory provides individual interfaces for each type of resources separately. If necessary, Provision Coordinator Factory can continue to manage the provision coordinator objects it generated;

A Resource Provision Controller (component): is used to control and manage a variety of low-level resources. Provision Coordinator instantiates a Resource Provision Controller upon each resource-provision request. Resource Provision Controller contacts with Resource, applies and uses physical resource to establish actual binding of resource point.

Comparing to prior art, the present invention has following advantages: the technology solution of the present invention is to design a mapping system for mapping the logical point-of-delivery to the physical point-of-delivery. With session mechanisms, it is capable of maintaining the completeness and consistency of each project's point-of-delivery environment after the mapping process. In fact, this is based on a new TINA-variation architecture which has four session layers: Access Session Layer, Service Session Layer, Resource Session Layer, and Provision Session Layer. Resource Session Layer and Provision Session Layer are among the novel features of the present invention. The service target of the new architecture is enterprise data center, not the telecommunication industry where TINA origins from anymore. The new architecture is left-right asymmetrical; it includes Project Developer Domain, Resource Provision Domain, and Application User Domain. The resources it involves are extended from network-connection resource only covered by standard TINA, to all assets under management in an enterprise data center, including network, storage, and computing resources.

DETAILED DESCRIPTION

The present invention and its embodiment will be further described in following sections with illustrations.

The embodiment of the present invention is a service delivery platform. The platform has four types of users: project developer, project operator, application user, and system operator.

Figure 1:
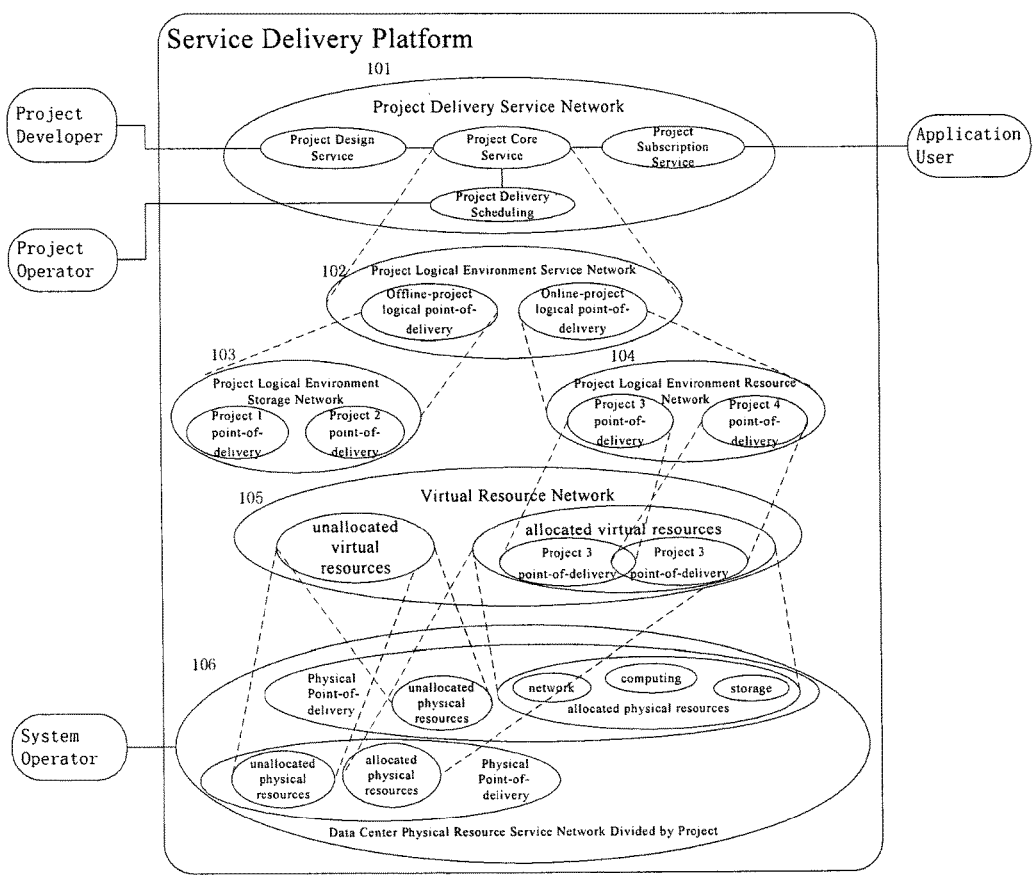
FIG. 1 illustrates a structure diagram of a service delivery platform according to the present invention.

Please see FIG. 1, which is the embodiment of the present invention, a service delivery platform. The service delivery platform includes: Project Delivery Service Network 101, Project Logical Environment Service Network 102, Project Logical Environment Storage Network 103, Project Logical Environment Resource Network 104, Virtual Resource Network 105, and Data Center Physical Resource Service Network Divided by Project 106.

Project Delivery Service Network 101 includes: Project Core Service, Project Design Service, Project Delivery Scheduling, and Project Subscription Service;

In Project Logical Environment Service Network 102, the project delivery and scheduling function supports automatic or manual "offline-online" environment switching, and supports the scheduling of point-of-delivery for multiple sets of projects. Project Logical Environment Service Network 102 includes the logical point-of-delivery of multiple sets of offline-projects and online-projects;

Project Logical Environment Storage Network 103: includes the point-of-delivery of multiple sets of offline-project instances;

Project Logical Environment Resource Network 104 includes: the point-of-delivery of multiple sets of online-project instances; for example: project 3 and project 4 in FIG. 1 are in "online" status, i.e. making dedicated-resource deliveries for the subscriptions.

In Virtual Resource Network 105, virtual resources aggregate physical resources of different configurations from different locations, to achieve resource consolidation regardless of types and deployments of the physical resources. Including unallocated and allocated virtual resources, Virtual Resource Network provides support (functions) of exclusive holding or sharing virtual resources.

Data Center Physical Resource Service Network Divided by Project 106 includes multiple sets of physical point-of-delivery. The Data Center Physical Resource Service Network Divided by Project 106 supports subscription-delivery of the point-of-delivery, and supports sharing physical resources by space or by time, including unallocated and allocated physical resources. For example: network, storage, computing resources. Besides various physical resources in physical data center, system operator is also responsible for defining the boundary of physical point-of-delivery.

By utilizing the latest technologies of computer and telecommunication, TINA defines a software architecture, which can organize complex business and network-management-software structure more effectively. And its service target is the telecommunication industry. The present invention has made some modifications and adjustments to TINA. The new architecture is used in a completely different field of resource management in enterprise data center. The embodiment of the present invention is based on the TINA-variation architecture. The new TINA-variation architecture and conventional TINA (and its applications) have following differences. Please see FIG. 2:

1) The service target of TINA architecture is the telecommunications industry; the service target of TINA-variation architecture of the present invention is enterprise data center.

2) TINA architecture includes three session layers: Access Session Layer, Service Session Layer, and Communication Session Layer; The TINA-variation architecture of the present invention includes four session layers: Access Session Layer 2004, Services Session Layer 2005, Resource Session Layer 2006, and Provision Session Layer 2007. Among them, Resource Session Layer 2006 and Provision Session Layer 2007 are among the novel features of the present invention.

3) In TINA architecture, each session involves "consumer domain—retailer domain—consumer domain", that means, each layer of TINA architecture is left-right symmetrical. This reflects the consumer-retailer-consumer relationship of telecommunication services (for example, a phone call or multimedia file transfer) between telecommunication industry and consumers. The architecture of the present invention is left-right asymmetrical. Please see FIG. 2, the left side is Project Developer Domain 2001, the middle part is Resource Provision Domain 2002, and the right side is Application User Domain 2003. The user of Project Developer Domain 2001 is project developer or project operator; the user of Application User Domain 2003 is application user. This reflects the relationship of different individuals managing or using a variety of resources within an enterprise data center.

4) In TINA architecture, the bottom level resource only includes the network connection resource provided to consumers. In the TINA-variation architecture of the present invention, the bottom level Resource 2050 contains all resources managed by an enterprise data center, including network, storage, and computing resources.

Figure 2:
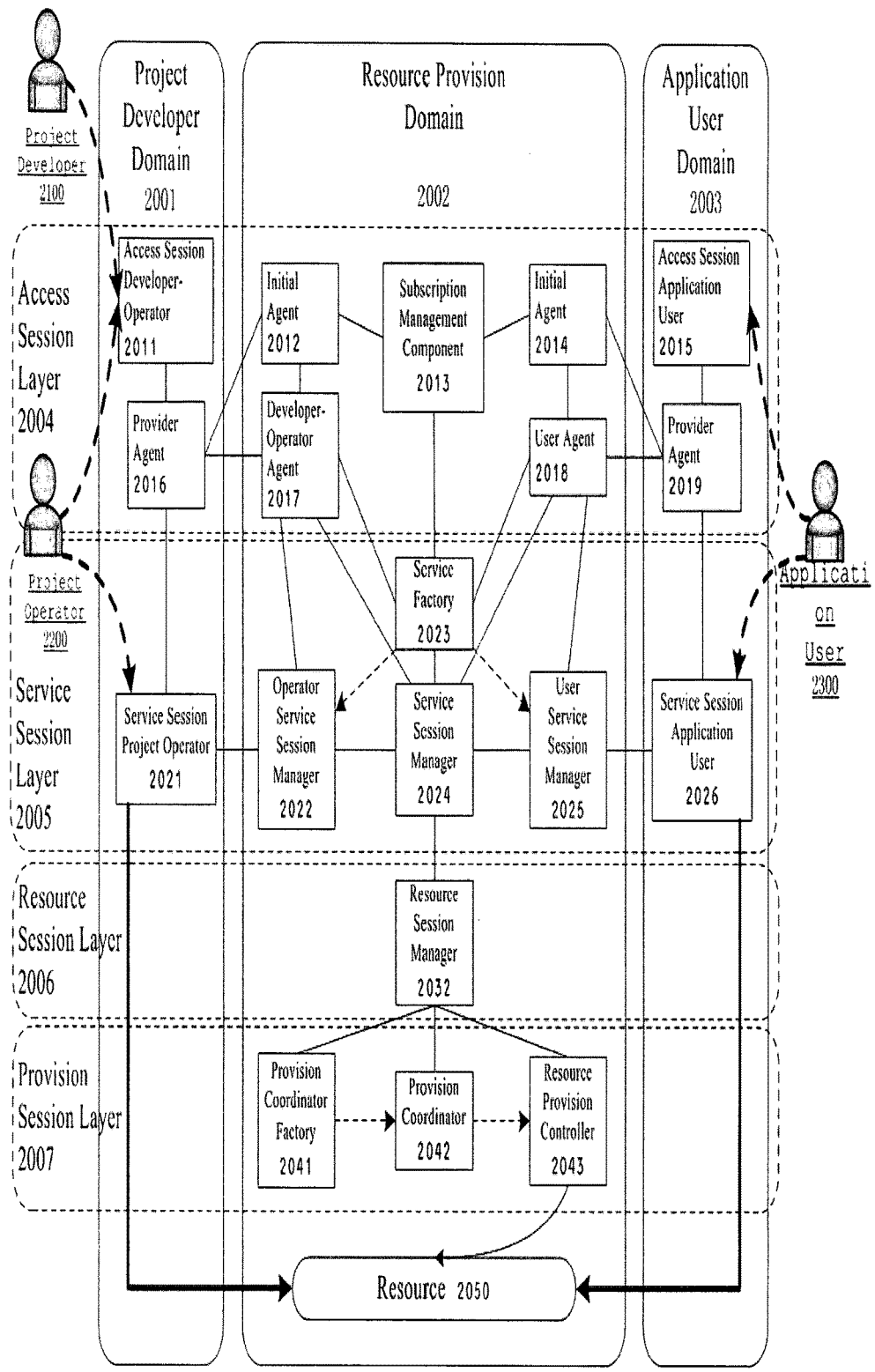
FIG. 2 illustrates a structure diagram of the new TINA-variation architecture according to the present invention.

Please see FIG. 2, which illustrates all the service components associated with sessions within a service delivery platform of the present invention. These service components are distributed in Project Developer Domain 2001, Resource Provision Domain 2002, and Application User Domain 2003:

Project Developer Domain 2001 and Application User Domain 2003 contain all instantiated components at developer/operator/user terminals.

Resource Provision Domain 2002 contains all instantiated components and resources (i.e. Resource 2050) at one or several resource provision points in the network.

Please see FIG. 2. In the TINA-variation architecture, all interactions among Project Developer Domain 2001, Resource Provision Domain 2002, and Application User Domain 2003 are carried out in the sessions. The TINA-variation architecture of the present invention includes four layers: Access Session Layer 2004, Service Session Layer 2005, Resource Session Layer 2006, and Provision Session Layer 2007. We describe them in details as following:

A. Access Session Layer 2004

Access Session Layer 2004 includes all the components that play roles during an access session. Access session is used for identity authentication of Project Developer 2100 and Application User 2300, and establishing a terminal for service session.

Please see FIG. 2, wherein the components of access session include: Access Session Developer-Operator 2011, Access Session Application User 2015, Provider Agent 2016 and 2019, Initial Agent 2012 and 2014, Subscription Management Component 2013, Developer-Operator Agent 2017, and User Agent 2018.

Please see FIG. 2, where Access Session Developer-Operator 2011 and Access Session Application User 2015 both have a graphical user interface for identity authentication of Project Developer 2100, Project Operator 2200, or Application User 2300. Provider Agent 2016 is used by Access Session Developer-Operator 2011 for communicating with Resource Provision Domain 2002. The communication process carried out through Initial Agent 2012. Initial Agent 2012 obtains subscription information of Project Developer 2100 from Subscription Management Component 2013, and authenticates the identity of Project Developer 2100 according to the subscription information, and then starts Developer-Operator Agent 2017. Provider Agent 2016 and Developer-Operator Agent 2017 work together to establish a secure personal access session. Thus, Project Developer 2100 can prepare a service session and subscribe the resources in the point-of-delivery. Access process of Project Operator 2200 is almost identical to the access process of Project Developer 2100 described above, so the repetitious details need not be given here.

Please see FIG. 2, Provider Agent 2019 is used by Access Session Application User 2015 for communicating with Resource Provision Domain 2002. The communication process carried out through Initial Agent 2014. Initial Agent 2014 obtains subscription information of Application User 2300 from Subscription Management Component 2013, and authenticates the identity of Application User 2300 according to the subscription information, and then starts User Agent 2018. Provider Agent 2019 and User Agent 2018 work together to establish a secure personal access session. Thus, Application User 2300 can choose to join a particular service session.

Before a Project Developer 2100 starts an access session, he or she must install project development tool on the local machine as terminal. Project Developer 2100 can logs in and start the subscription service as an anonymous user. Subscription service allows Project Developer 2100 to fill in personal account data, such as login user name and password (hereafter Project Developer 2100 is no longer an anonymous user). Subscription service also allows Project Developer 2100 to subscribe a set of resources provided in Resource Provision Domain 2002—Project Developer 2100 can plan a logical point-of-delivery. The logical point-of-delivery includes server, storage, and network resources.

Before Application User 2300 opens an access session, he or she must install the project execution tool on the local machine as terminal. After Application User 2300 creates an account, he or she can request to join a particular service session.

Before Project Operator 2200 (can be regarded as a super-user) opens an access session, Project Operator 2200 must install the project management tool on the local machine as terminal. After Project Operator 2200 login, he or she can see the session list of un-launched and off-line sessions. Project Operator 2200 can choose when and which session to have "offline—online" or "online—offline" switching. He or she can also approve Application User 2300 to join a particular service session.

In addition, Application User 2300 can also be invited by Project Operator 2200 to join the service session. Application User 2300 may accept or decline the invitation. If the invitation is accepted, Application User 2300's Service Session Application User 2026 will be started, and the user will be added into the component. Therefore, during a session, there may be new invitations arriving to Application User 2300, i.e., Provider Agent 2019 leads to open a dialog window for Application User 2300, let the user to choose whether he/she shall accept or decline the invitation.

Subscription Management Component 2013 interacts with other components mainly during access session. In the authentication processes of Project Developer 2100, Project Operator 2200, and Application User 2300, Initial Agent 2012 and 2014 extract the subscription information of Project Developer 2100, Project Operator 2200, and Application User 2300 by contacting with Subscription Management Component 2013. Developer-Operator Agent 2017 and User Agent 2018 also extract the information of Project developer 2100, Project Operator 2200, and Application User 2300, and obtain or store the attributes of them by contacting with Subscription Management Component 2013. Since Subscription Management Component 2013 also contains the description of services, in service session, Service Factory 2023 also extracts needed information to instantiate concrete components by contacting Subscription Management Component 2013.

Subscription Management Component 2013 can manage the whole package of services offered by Resource Provision Domain 2002, including the contract between Application User 2300 and service. Therefore, Subscription Management Component 2013 may contain multiple logical point-of-delivery and the parameters of various resources in the logical point-of-delivery. This component provides the functions mainly are:

Create, modify, delete, and query subscriber (e.g. related application user, application use group, etc.);
Create, modify, delete, and query subscriber related information;
Create, modify, delete, and query service contract (description-file definition of the subscription service);
Extract the list of services, including the service description file extracted from Service Management Component 2013 for the application user (or terminal).

When an access session is successfully completed, Service Factory 2023 can initiate a service session to (automatically) select one or more virtual resources needed. Application User 2300 can find a variety of virtual resources defined by logical point-of-delivery in service session. In general case, each development project is corresponding to a logical point-of-delivery; each logical point-of-delivery needs a service session.

B. Service Session Layer 2005

Service Session Layer 2005 of the TINA-variation architecture can hold one or multiple service sessions, and carry out (virtual) resource bindings in Resource Provision Domain 2002. Usually a service session is corresponding to one project.

Please see FIG. 2. FIG. 2 includes all the components in Service Session Layer 2005. In Resource Provision Domain 2002, when Service Factory 2023 receives a request from Developer-Operator Agent 2017, it will create Service Session Manager 2024 and Operator Service Session Manager 2022. After Service Factory 2023 receives a request from User Agent 2018, it will create User Service Session Manager 2025.

The present invention only supports single Service Facility 2023; Service Factory 2023 creates a Service Session Manager 2024 object for each service session through the platform. Service Factory 2023 can obtain component names of Service Session Manager 2024, Operator Service Session Manager 2022, and User Service Session Manager 2025 corresponding to a concrete service session from Subscription Management Component 2013. The reason of using single Service Factory 2023 is because there is no need of using multiple Service Factory 2023 in our implementation. Once single Service Factory 2023 has difficulty to cope with the situation while the number of service increases, we can easily create additional Service Facility 2023 (i.e., supports multiple Service Facility 2023).

In Service Session Layer 2005, Service Session Project Operator 2021 and Service Session Application User 2026 are created by Provider Agent 2016 and 2019, respectively. Services Session Project Operator 2021 provides services to Project Operator 2200, and Service Session Application User 2026 provides services to Application User 2300.

Service Session Manager 2024 maintains a global view of a session, including the session participators, the resource bindings, and the resource model. In another word, the session model is not distributed in places where Service Session Manager 2024, each Operator Service Session Manager 2022, and User Service Session Manager 2025 locate. This design method reflects the deep consideration that a session model must be consistent and must be easy to maintain. Service Session Manager 2024 is the control point of accessing the session model information.

A session consists of various elements: session participators, resource bindings, and relationships that control the session. Therefore, a session model is fixed—so there is no negotiation operation regarding which model to support when a service is starting. Operator Service Session Manager 2022 and User Service Session Manager 2025 only act as the security controllers of accessing Services Session Manager 2024, as well as the service windows of Services Session Project Operator 2021 and Service Session Application User 2026.

Session participators (i.e. each application user) must have a clear invitation to join a service session. In services session, adding or deleting a resource is carried out through the interface of Service Session Manager 2024.

Concrete services are built upon the components in Service Session Layer 2005. These components include Service Session Project Operator 2021, Service Session Application User 2026, Service Session Manager 2024, Operator Service Session Manager 2022, and User Service Session Manager 2025. These components provide the service session management functions which are necessary for each service. Through these service session management functions, service session can be started or deleted. Services session can also add, modify, or delete session participants and bound resources.

C. Resource Session Layer 2006

Components in Resource Session Layer 2006 are used to manage resource network and control resource session. Resource session provides a resource binding view of different session participants. Usually, a resource session uses QoS (Quality of Service) parameters and abstract logical-resource description to define a resource binding. Resource session encapsulates some details, which involve the matching process between QoS request and concrete resource features (such as server, storage, and network capabilities).

Please see FIG. 2, there is only one component playing role in resource session: Resource Session Manager 2032 manages end-to-end resource provision. The capabilities of each resource point should match with the requirement, and the state of concrete resource should be "available". The results of checking QoS parameters and resource capabilities will become various conditions of mapping virtual resources into physical resources. Every allocated virtual resource belongs to some online logical point-of-delivery.

Each resource point has some specific resource capabilities. For example, CPU performance, storage size. These requirements are provided as input to Resource Session Manager 2032, in order to select a resource provider. The resource provider should have a contract-description file that used to control the concrete physical resource.

D. Provision Session Layer 2007

Components in Provision Session Layer 2007 are used to manage and control provision session. Provision session hides network-provision details from resource session. Under the premise of existing special resources of network-provision details mapping to several provision networks, a provision session may across multiple provision networks, a situation both service session and provision session will know.

Please see FIG. 2. Provision Session Layer 2007 includes three components: Provision Coordinator Factory 2041, Provision Coordinator 2042, and Resource Provision Controller 2043. Provision Coordinator Factory 2041 is a factory of Provision Coordinator 2042. Provision Coordinator 2042 creates and controls whole provision session.

A provision session consists of two parts: network-resource points and network provisions. Each network provision is created and controlled by individual Resource Provision Controller 2043. Provision Coordinator 2042 instantiates a Resource Provision Controller 2043 for each network provision request. Resource Provision Controller 2043 contacts with a variety of resources in Resource 2050, applies and uses physical resources in order to establish actual bindings of resource points in the network. Each allocated virtual resource can be mapped to one or multiple resource points, i.e. delivered by one or multiple physical resources.

In the TINA-variation architecture, the session protocols are capable of maintaining the completeness and consistency of a project plan/design's point-of-delivery environment.

Figure 3:
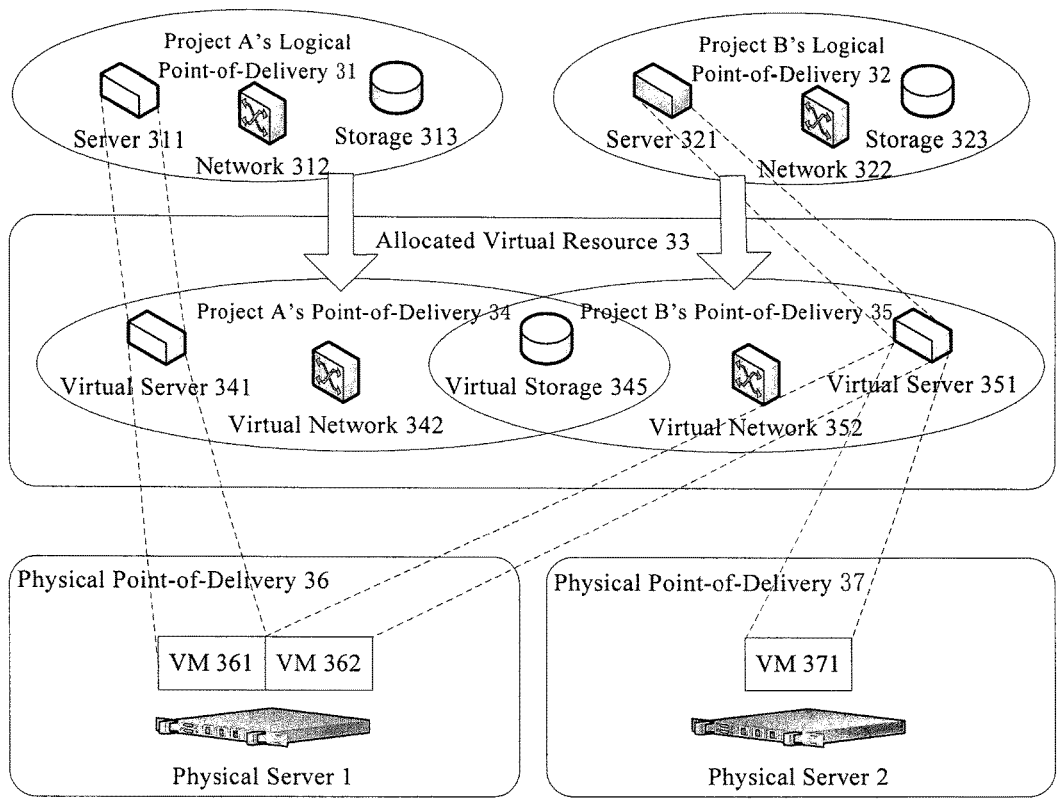
FIG. 3 illustrates a structure diagram of the embodiment of a mapping system for mapping the logical point-of-delivery to the physical point-of-delivery.

FIG. 3 depicts two concrete examples of how the service delivery platform of the present invention maintains the completeness and consistency of project's point-of-delivery environment in the processes of mapping logical point-of-delivery into physical point-of-delivery.

Please see FIG. 3, where a project developer has designed two point-of-delivery environments: Project A's Logical Point-of-Delivery 31 and Project B's Logical Point-of-Delivery 32. Server 311 and server 321 are two identical servers, which have been allocated to Project A's Logical Point-of-Delivery 31 and Project B's Logical Point-of-Delivery 32, respectively.

When the two sets of logical point-of-delivery are both on-line, they either exclusively hold or share each virtual resource in Allocated Virtual Resource 33: Server 311 holds Virtual Server 341; Server 321 holds Virtual Server 351. (In FIG. 3, Network 312 holds Virtual Network 342; Network 322 holds Virtual Network 352; shared Storage 313 and Storage 323 holds Virtual Storage 345.)

Please see FIG. 3. Virtual Server 341 is delivered by virtual machine VM 361 in Physical Point-of-Delivery 36; Virtual Server 351 is delivered by virtual machine VM 362 in Physical Point-of-Delivery 36. Virtual machine VM 361 and VM 362 share Physical Server 1 in Physical Point-of-Delivery 36 through time sharing. When virtual machine VM 361 switches to virtual machine VM 362, Virtual Server 341 is therefore suspended and Virtual Server 351 starts to execute. At this moment, the virtual network collaborating with Virtual Server 351 must be Virtual Network 352 rather than Virtual Network 342, while virtual storage (Virtual Storage 345) may remain unchanged. This is because Virtual Server 351, Virtual Network 352, and Virtual Storage 345 are belong to the same point-of-delivery (i.e., Project B's Point-of-Delivery 35), but Virtual Network 342 is not. Session protocol can record resources in the same point-of-delivery into same session, thus it can maintain the completeness of the project plan/design's point-of-delivery environment.

Please see FIG. 3. When virtual machine VM 371 in Physical Point-of-Delivery 37 is idle, or when virtual machine VM 362 in Physical Point-of-Delivery 36 fails, the delivery of Virtual Server 351 can be scheduled from virtual machine VM 362 to virtual machine VM 371. Because the session protocol is "stateful", in point-to-point resource provision process it can handle failure and make recovery. It can also take advantage of proxy/gateway to search and maintain resource states across virtual network cluster.

The session protocol ensures the state of workload on Virtual Server 351 is consistent with the original one after the workload migrates from virtual machine VM 362 to virtual machine VM 371, i.e. session protocol can maintain the completeness of the project plan/design's point-of-delivery environment.

One of the common session protocols is SIP (session initiation protocol). The session package header of SIP contains user identity and history record of proxy transmission. Session instruction of SIP can synchronize checkpoints. A user request will generate access session first, and the main workload of the session is user's access request and final response. Access request will generate service session after the request has been authenticated. In the service session, the main workload is logical point-of-delivery. Logical point-of-delivery and user requested resource are bound together. When a project is completed, they will be unbound. And the service session will be over. The main workloads of resources session are the logical resources to be competed, selected, and isolated. The main workloads in provision session are to-be-converged physical resourced in Resource 2050.

In our experience, the proposed architecture of the present invention is quite practical. It is a very flexible model that can be dynamically implemented through PCDM (Project Component Decomposition Method). Once being instantiated, you can easily integrate the components into the embodiment of the present invention, such as the service delivery platform in the present invention.

Traditionally, TINA describes telecommunication services through a series of interactive computing objects called "components". The major components in TINA architecture can be classified into two types of components: General Service Component and Specific Service Component. General Service Component serves for public use; Specific Service Component serves for specific service use (such as representing service logic, data, management, etc.).

Although the internal mechanisms of the components in present invention are very different from original TINA's, the description of embodiment still uses the term of "component". With illustrating figures, the detailed method of the present invention is introduced through the embodiment as following.

Please see FIG. 2, where access session related components are: Access Session Developer-Operator 2011, Access Session Application User 2015, Provider Agent 2016, 2019, Initial Agent 2012, 2014, Developer-Operator Agent 2017, User Agent 2018, and Subscription Management Component 2013.

Access Session Developer-Operator 2011 is used to create a new session. In the session, project developer can plan a logical point-of-delivery, in order to establish project-specific resource requirements. Project operator can set up a schedule to activate a project at a specific time when the logical point-of-delivery will be mapped to physical point-of-delivery.

In Access Session Application User 2015, a user can join a session and find his/her point-of-delivery. Then the user can use his/her resources.

Provider Agent 2016 and 2019 are used to help project developer/project operator/application user to establish trust relationships between them and provider (i.e., Resource Provision Domain 2002). They send project-operator request to Developer Operator Agent 2017 to create a new session, or receive application-user invitation from User Agent 2018. Each creation of an access session will generate an instance of Provider Agent 2016 or 2019.

Initial Agent 2012 and 2014 are the components independent of project developer, project operator and application user. In Resource Provision Domain 2002, they are initial access points. When a project developer, project operator or application user wants to establish a contact or create a session with Resource Provision Domain 2002, Initial Agent 2012 or 2014 will reply a message to Provider Agent 2016 or 2019. By interacting with Provider Agent 2016 or 2019, Initial Agent 2012 or 2014 supports project developer, project operator or application user to authenticate his/her identity and establish trust relationship with Resource Provision Domain 2002.

Developer-Operator Agent 2017 represents project developer or project operator in Resource Provision Domain 2002. In access session, it acts as a single contact point to control and manage new Operator Service Session Manager 2022. The contact information between project developer/project operator and Resource Provision Domain 2002 can also be obtained from Developer-Operator Agent 2017.

User Agent 2018 represents application user in Resource Provision Domain 2002. In access session, it acts as a single contact point to control and manage new User Service Session Manager 2025. The contact information between application user and Resources Provision Domain 2002 can also be obtained from User Agent 2018.

Subscription Management Component 2013 provides functions of managing subscription-service-information model in Resource Provision Domain 2002.

Please see FIG. 2, where service session related components include: Services Session Project Operator 2021, Service Session Application User 2026, Service Factory 2023, Service Session Manager 2024, Operator Service Session Manager 2022, and User Service Session Manager 2025.

Services Session Project Operator 2021 is a project operator related service component. It acts as a concrete service endpoint. Through proper interface, it enables project operator to access Operator Service Session Manager 2022. It also supports some general service session control capabilities. For each service session it involves, it will interact with Operator Service Session Manager 2022.

Services Session Application User 2026 is an application user related service component. It acts as a concrete service endpoint. Through proper interface, it enables application user to access User Service Session Manager 2025. It also supports some general service session control capabilities. For each service session it involves, it will interact with User Service Session Manager 2025.

Service Factory 2023 is a concrete-service-related service component, which is used to create object instances (including instances of Operator Service Session Manager 2022, User Service Session Manager 2025, and Service Session Manager 2024). The creation is usually requested by Developer-Operator Agent 2017 or User Agent 2018. If application user object requests the creation, it must have an interface for accessing Service Factory 2023, and send a proper request. A multi-service type Service Factory 2023 should provide different interfaces for each type of services, respectively. If necessary, Service Factory 2023 can continue to manage the service component it generated.

Service Session Manager 2024 is used for service session control. In service session, Service Session Manager 2024 supports service capabilities which can be shared by multiple applications users. In service session, Service Session Manager 2024 supports operations of tracking and controlling (virtual) resources. It also supports management capabilities related to service session. Service Session Manager 2024 is instantiated by Service Factory 2023. Service Factory 2023 generates a Service Session Manager 2024 upon the request. And the instance of Service Session Manager 2024 will be deleted when the project developer leaves the service session or Service Session Manager 2024 is terminated by Service Factory 2023.

Operator Service Session Manager 2022 holds local project operator related performance data and information. If an operation only involves local project operator, Operator Service Session Manager 2022 will use its own control and management capabilities; otherwise, Operator Service Session Manager 2022 and Service Session Manager 2024 will support the operation together. Operator Service Session Manager 2022 is also generated by the instantiation of Service Factory 2023. Service Factory 2023 generates an Operator Service Session Manager 2022 upon the request. The instance of Operator Service Session Manager 2022 will be deleted when the project developer leaves the session.

User Service Session Manager 2025 holds local application-user related performance data and information. If an operation only involves local application user, User Service Session Manager 2025 will use its own control and management capabilities; otherwise, User Service Session Manager 2025 and Service Session Manager 2024 will support the operation together. User Service Session Manager 2025 is also generated by the instantiation of Service Factory 2023; Service Factory 2023 generates a User Service Session Manager 2025 upon the request, the instance of User Service Session Manager 2025 will be deleted when application user leaves the service session.

Please see FIG. 2, resource session related component includes Resource Session Manager 2032 only. Resource Session Manager 2032 is used to manage end-to-end resource provision. It provides an interface that allows User Service Session Manager 2025, Operator Services Session Manager 2022, and Service Session Manager 2024 to create, modify, and delete end-to-end resource provision.

Provision session related components include: Provision Coordinator 2042, Provision Coordinator Factory 2041, and Resource Provision Controller 2043.

Provision Coordinator 2042 is used to coordinate low-level physical resources.

Provision Coordinator Factory 2041 is used to create provision coordinator object instance. Provision Coordinator Factory 2041 provides individual interface for each type of resources. If necessary, Provision Coordinator Factory 2041 can continue to manage the provision coordinator object it generated.

Resource Provision Controller 2043 is used to control and manage a variety of low-level resources. Provision Coordinator 2042 instantiates a Resource Provision Controller 2043 for each resource-provision request. Resource Provision Controller 2043 contacts with Resource 2050, applies and uses physical resource to establish the actual binding of resource point in the network.

The session unrelated component is Resource 2050. Resource 2050 refers to a variety of physical resources, including IT, storage, and network resources.

Based on FIG. 1 and FIG. 2, the flow processes of an embodiment of the present invention are described as following.

Figure 4:
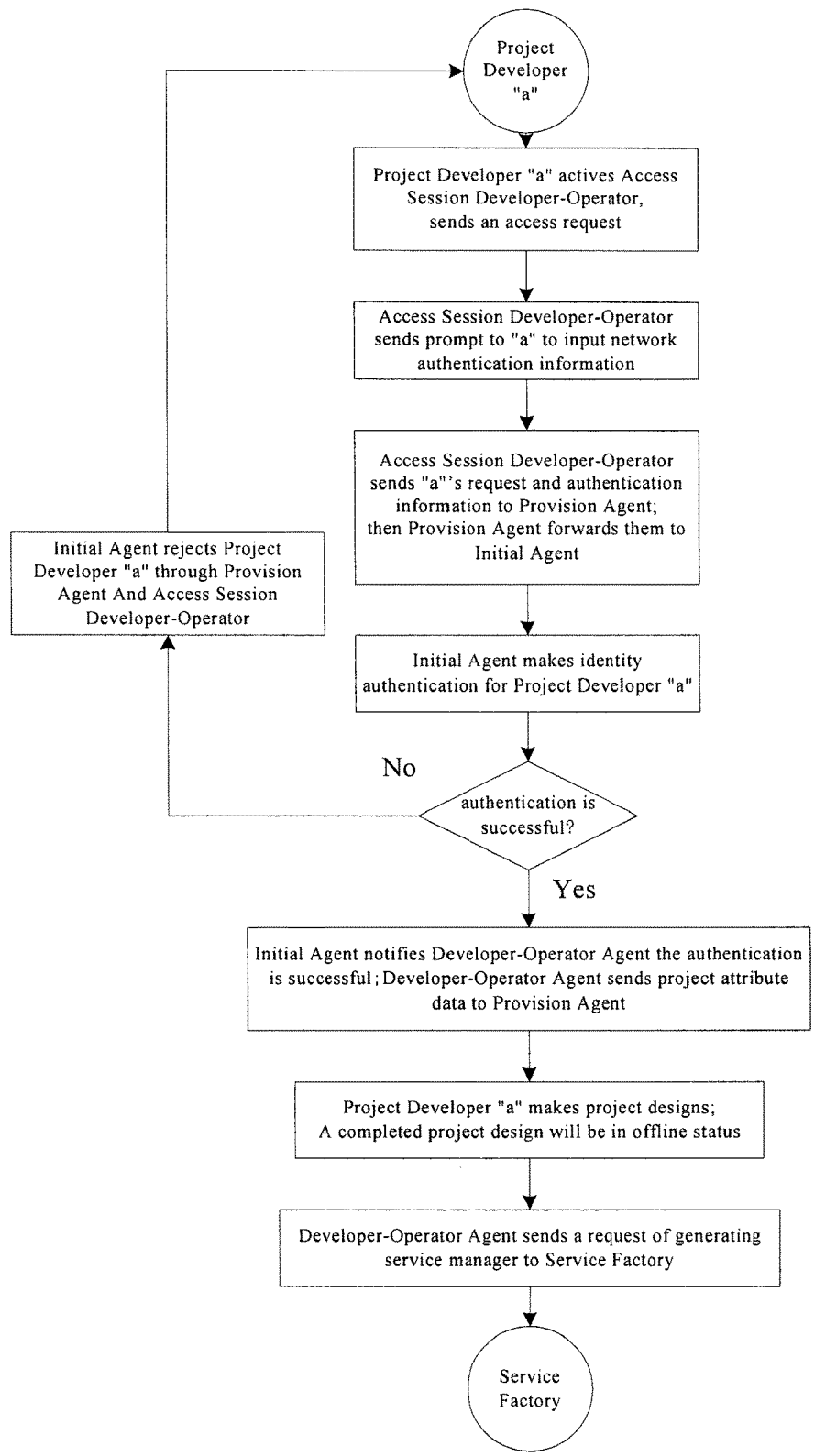
FIG. 4 illustrates a flowchart of project developer "a" sending a request.

Please see FIG. 4. Project Developer"a" makes a request. The flow process following the request includes:

Project Developer"a" actives Access Session Developer-Operator 2011, and sends an access request; Access Session Developer-Operator 2011 sends prompt to"a" to input network authentication information.

Access Session Developer-Operator 2011 sends"a"'s request and authentication information to Provider Agent 2016; then Provider Agent 2016 forwards them to Initial Agent 2012.

Initial Agent 2012 obtains user-related data from Subscription Management Component 2013 and makes identity authentication for Project Developer"a". (if necessary, Initial Agent 2012 will interact directly with user through Provider Agent 2016). If the authentication fails, Initial Agent 2012 will reject Project Developer"a" through Provider Agent 2016 and Access Session Developer-Operator 2011; if the authentication is successful, Initial Agent 2012 will notify Developer-Operator Agent 2017; Developer-Operator Agent 2017 sends project attribute data and terminal attribute data to Provider Agent 2016 and continues the follow-up process.

Supported by Project Delivery Service Network 101, Project Developer"a" can make project designs, for example: planning the logical point-of-delivery required by Project 3, i.e. network, storage, and computing resource environment. Some projects also include applications. A completed project design (corresponding to a logical point-of-delivery) will be in offline status.

Developer-Operator Agent 2017 sends a request of generating service manager to Service Factory 2023 based on the attributes of Project Developer"a"'s point-of-delivery.

Figure 5:
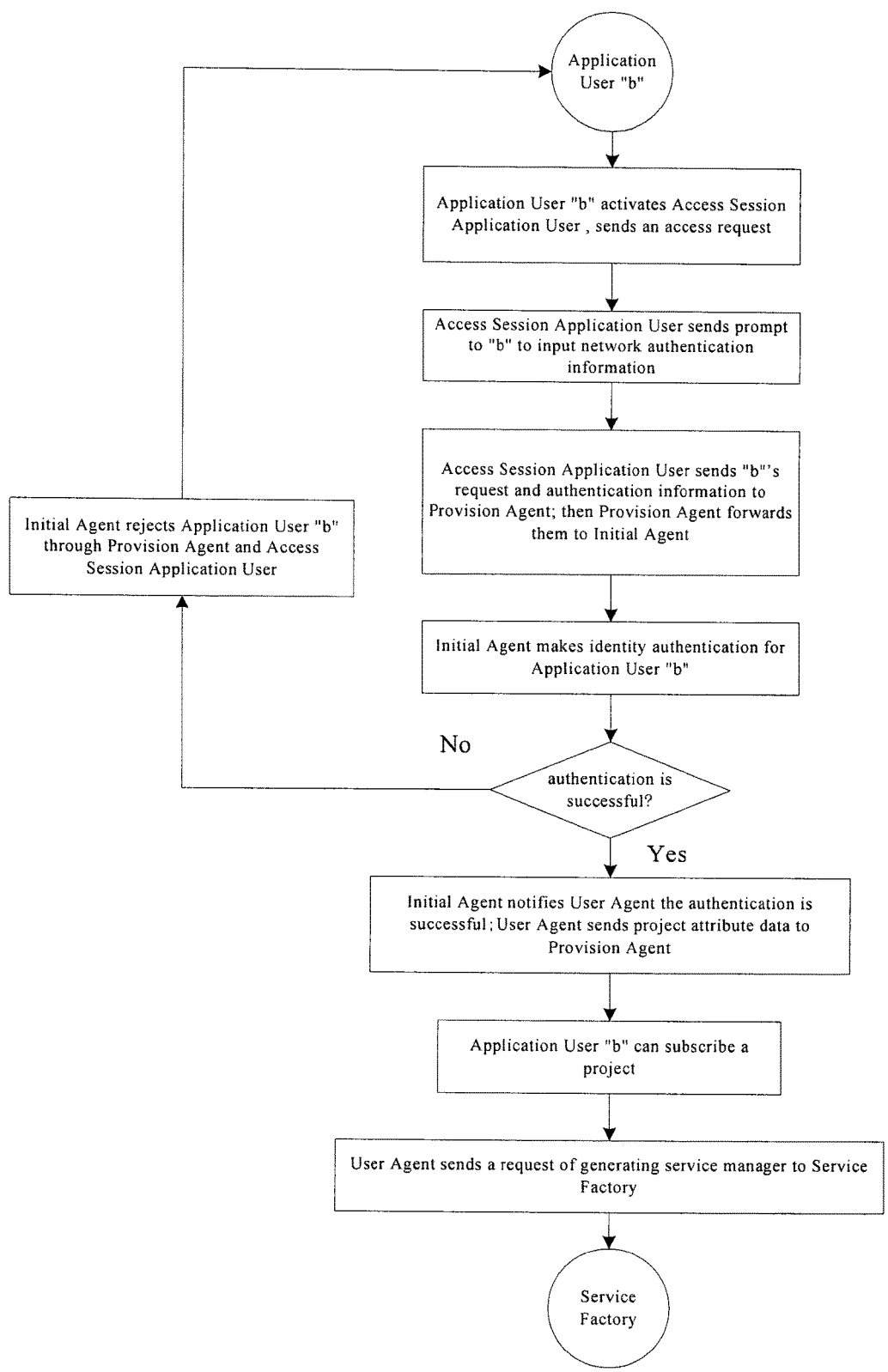
FIG. 5 illustrates a flowchart of application user "b" sending a request.

Please see FIG. 5. Application User"b" makes a request. The flow process following the request includes:

Application User"b" activates Access Session Application User 2015 and sends an access request; Access Session Application User 2015 sends prompt to"b" to input network authentication information.

Access Session Application User 2015 sends"b"'s request and authentication information to Provider Agent 2019; then Provider Agent 2019 forwards them to Initial Agent 2014.

Initial Agent 2014 obtains user-related data from Subscription Management Component 2013 and makes identity authentication for Application User"b". (if necessary, Initial Agent 2014 will interact directly with user through Provider Agent 2019). If the authentication fails, Initial Agent 2014 will reject Application User"b" through Provider Agent 2019 and Access Session Application User 2015; if the authentication is successful, Initial Agent 2014 will notify User Agent 2018; User Agent 2018 sends project attribute data and terminal attribute data to Provider Agent 2019 and continues the follow-up process.

Supported by Project Delivery Service Network 101, Application User"b" can subscribe a project.

User Agent 2018 sends a request of generating service manager to Service Factory 2023 based on the attributes of User"b".

Figure 6:
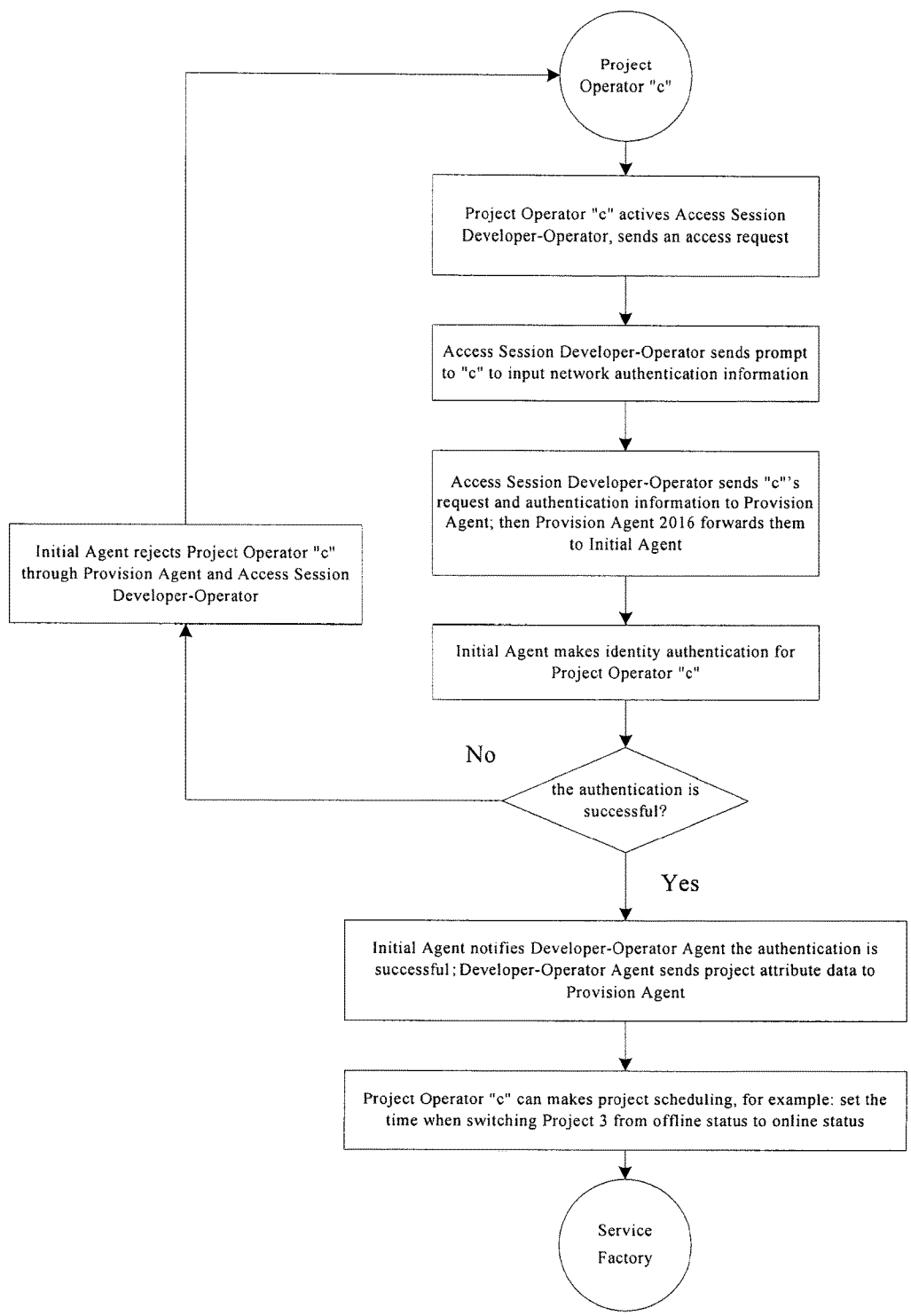
FIG. 6 illustrates a flowchart of project operator "c" sending a request.

Please see FIG. 6. Project Operator"c" makes a request. The flow process following the request includes:

Project Operator"c" actives Access Session Developer-Operator 2011 and sends an access request; Access Session Developer-Operator 2011 sends prompt to"c" to input network authentication information.

Access Session Developer-Operator 2011 sends"c""s request and authentication information to Provider Agent 2016; then Provider Agent 2016 forwards them to Initial Agent 2012.

Initial Agent 2012 obtains user-related data from Subscription Management Component 2013 and makes identity authentication for Project Operator"c". (if necessary, Initial Agent 2012 will interact directly with user through Provider Agent 2016). If the authentication fails, Initial Agent 2012 will reject Project Operator"c" through Provider Agent 2016 and Access Session Developer-Operator 2011; if the authentication is successful, Initial Agent 2012 will notify Developer-Operator Agent 2017; Developer-Operator Agent 2017 sends project attribute data and terminal attribute data to Provider Agent 2016 and continues the follow-up process.

Supported by Project Logical Environment Service Network 102, Project Operator"c" can make project scheduling, for example: set the time when switching Project 3 from offline status to online status (i.e., the time when mapping the logical point-of-delivery to physical point-of-delivery).

Figure 7:
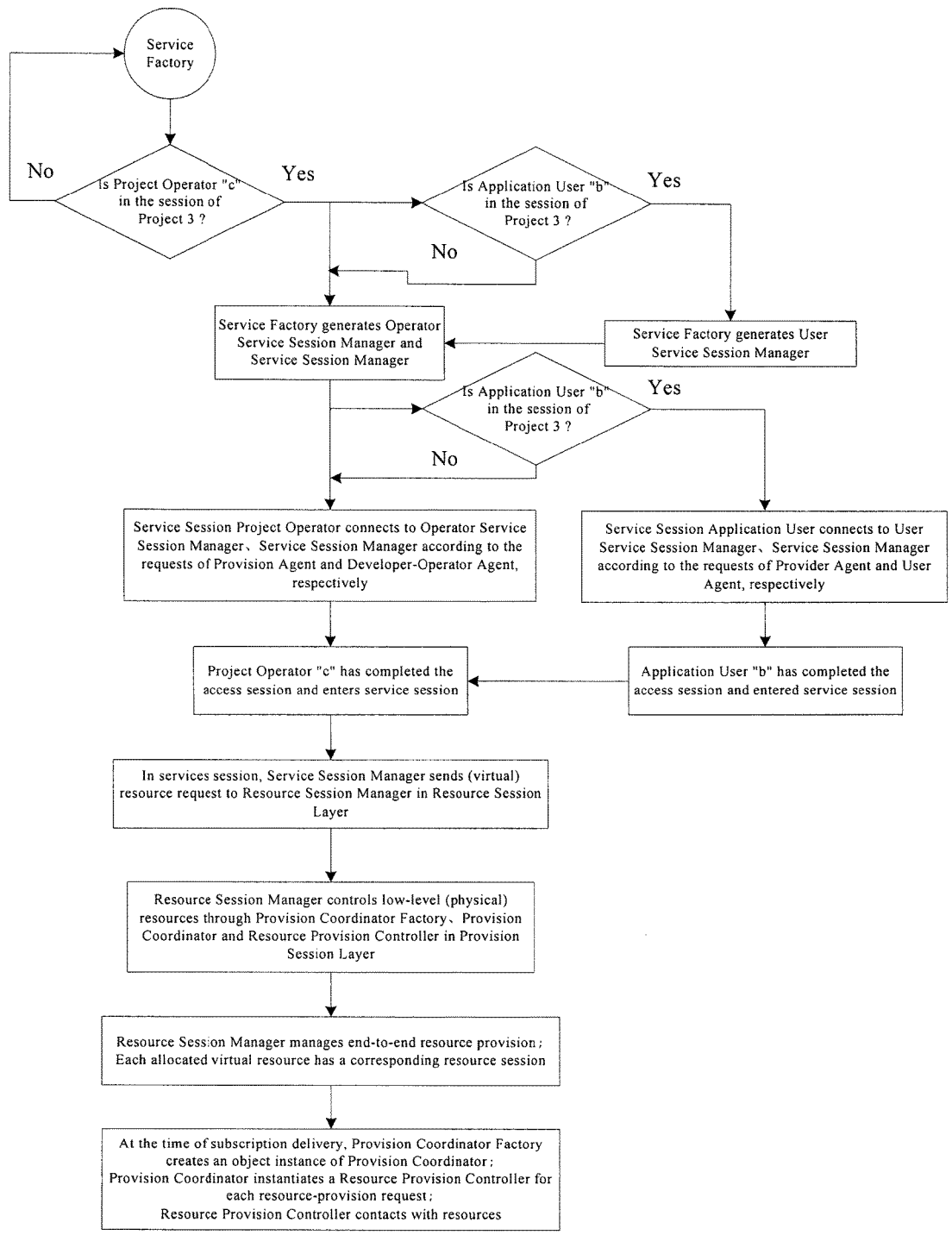
FIG. 7 illustrates a flowchart of Service Factory generating a service session.

Please see FIG. 7. Service Factory 2023 generates a service session, and the flow process following the service-session creation includes:

If Project Operator"c" and Application User"b" are both in the session of Project 3, Service Factory 2023 will generate Operator Service Session Manager 2022, User Service Session Manager 2025, and Service Session Manager 2024 for Project 3. If only Project Operator"c" exists in the session of Project 3, Service Factory 2023 will generate Operator Service Session Manager 2022 and Service Session Manager 2024.

Service Session Project Operator 2021 connects to Operator Service Session Manager 2022 and Service Session Manager 2024 according to the requests of Provider Agent 2016 and Developer-Operator Agent 2017, respectively. Thus, Project Operator"c" has completed the access session and enters service session.

If Application User"b" is in the session of Project 3, Service Session Application User 2026 connects to User Service Session Manager 2025 and Service Session Manager 2024 according to the requests of Provider Agent 2019 and User Agent 2018, respectively. Thus, Application User"b" has completed the access session and entered service session.

In services session, Service Session Manager 2024 sends (virtual) resource request to Resource Session Manager 2032 in Resource Session Layer 2006. Resource Session Manager 2032 controls low-level (physical) resources in Resource 2050 through Provision Coordinator Factory 2041, Provision Coordinator 2042 and Resource Provision Controller 2043 in Provision Session Layer 2007.

Supported by Virtual Resource Network 105 (mostly supported by virtual resource exclusive holding or sharing), Resource Session Manager 2032 manages end-to-end resource provision. Each allocated virtual resource has a corresponding resource session. Resource Session Manager 2032 also provides an interface for Services Session Layer 2005, which allows User Service Session Manager 2025/ Operator Service Session Manager 2022/Service Session Manager 2024 to create, modify, or delete end-to-end (virtual) resource provision. For example, Class I server is needed in Project 3, then Service Session Manager 2024 will establish a corresponding resource session for Class I server.

Supported by Data Center Physical Resource Service Network Divided by Project 106, Provision Coordinator 2042 coordinates a variety of low-level (physical) resources. At the time of subscription delivery, Provision Coordinator Factory 2041 creates an object instance of Provision Coordinator 2042 (a Provision Coordinator Factory 2041 should provide individual interface for each type of resources). For example: Provision Coordinator Factory 2041 creates a Provision Coordinator 2042 for Class I server.

Supported by Data Center Physical Resource Service Network Divided by Project 106, Resource Provision Controller 2043 controls and manages a variety of low-level resources. Provision Coordinator 2042 instantiates a Resource Provision Controller 2043 for each resource-provision request (for example: a Class I server request). Resource Provision Controller 2043 contacts with resources (e.g., a Class I physical server), so that Application User"b" can apply and use physical resources in the network.

If Application User"b" is in Project 3's session, Application User"b" can use resources in the physical point-of-delivery including Class I physical server through Service Session Application User 2026. It is noteworthy that the process of mapping logical point-of-delivery to physical point-of-delivery is transparent to user.

The above embodiment is provided to those skilled in the art to implement and utilize the present invention. Those who skilled in the art may make various modification or variation to the embodiment described above without departing from the innovative idea of the present invention. Therefore the scope of the present invention shall not limit to the above embodiment, and it should be in the maximum range of innovative features that are consistent with the claims mentioned.

What is claimed is:

1. A computer implemented system including at least one computer processor for executing a mapping system of mapping logical point-of-delivery to physical point-of-delivery for cloud computing resource management in enterprise data center, wherein the mapping system is executed in a service delivery platform according to a new Telecommunication Information Networking Architecture (TINA)-variation architecture;

a service target of the TINA-variation architecture is an enterprise data center;

the TINA-variation architecture includes an Access Session Layer, a Service Session Layer, a Resource Session Layer, and a Provision Session Layer, the TINA-variation architecture is left-right asymmetrical;

physical resources of the TINA-variation architecture include IT resources, storage resources, and network resources;

the service delivery platform is used by a project developer, a project operator, an application user, and a system operator;

wherein the service delivery platform includes a Project Delivery Service Network, a Project Logical Environment Service Network, a Project Logical Environment Storage Network, a Project Logical Environment Resource Network, a Virtual Resource Network, and a Data Center Physical Resource Service Network Divided by Project;

the Project Delivery Service Network includes a Project Core Service, a Project Design Service, a Project Delivery Scheduling, and a Project Subscription Service;

the Project Logical Environment Service Network includes multiple sets of offline-projects' and online-projects' logical point-of-delivery, in which the project-delivery-and-scheduling function supports automatic or manual offline-online environment switching, and supports scheduling multiple sets of projects' point-of-delivery;

the Project Logical Environment Storage Network includes multiple sets of offline-project instances' point-of-delivery;

the Project Logical Environment Resource Network includes multiple sets of online-project instances' point-of-delivery;

the Virtual Resource Network in which virtual resources aggregate physical resources of different configurations and different locations, is configured to achieve resource consolidation regardless of type and deployment of the physical resources; wherein the virtual resource network includes unallocated and allocated virtual resources and the Virtual Resource Network provides support of exclusive holding or sharing virtual resources;

the Data Center Physical Resource Service Network Divided by Project includes multiple sets of physical point-of-delivery; the Data Center Physical Resource Service Network Divided by Project supports subscription and commitment of the point-of-delivery, and supports sharing physical resources by space or by time; and the Data Center Physical Resource Service Network Divided by Project includes unallocated and allocated physical resources;

wherein the Access Session Layer includes access session related components: an Access Session Developer-Operator, an Access Session Application User, two Provider Agents, two Initial Agents, a Developer-Operator Agent, a User Agent, and a Subscription Management Component; wherein the Access Session Developer-Operator is used to create a new session in which the project developer plans a logical point-of-delivery, while the developer obtains the project-specific resource requirements; the project operator schedules the activate time, the moment when the project's logical point-of-delivery maps to physical point-of-delivery;

the Access Session Application User by which user joins a session, finds the point-of-delivery, and then the user can use the resources;

the Two Provider Agent help project developer, project operator or application user to establish trust relationships among them; send a project-developer request to the Developer-Operator Agent to establish new session; or receive an invitation from the User Agent for application user; wherein each access session creation will generate a Provider Agent instance;

the Two Initial Agent are independent of project developer, project operator, and application user; the two initial agent are the initial access points in a Resource Provision Domain; When project developer, project operator or application user try to contact or create session with Resource Provision Domain, Initial Agent will reply a message to Provider Agent; By interacting with Provider Agent, Initial Agent supports identity authentication and trust relationship establishment between project developer/project operator/application user and Resource Provision Domain;

the Developer-Operator Agent is on behalf of project developer or project operator in the Resource Provision Domain, and acts as a single contact point in access session, to control and manage new project's Operator Service Session Manager, contact information between the project developer or project operator and the Resource Provision Domain can be obtained from the Developer-Operator Agent as well;

the User Agent is on behalf of application user in the Resource Provision Domain, and acts as a single contact point in access session to control and manage a new User Service Session Manager; contact information between the application user and the Resource Provision Domain can be obtained from the User Agent as well;

the Subscription Management Component provides the management function of subscription-service information model in the Resource Provision Domain.

2. The system of claim 1, wherein the TINA-variation architecture includes several session-related service components in the service delivery platform;

the service components are distributed in a Project Development Domain, a Resource Provision Domain, and an Application User Domain;

the Project Development Domain and Application User Domain contain all instantiated components at developer, operator or user terminal;

the Resource Provision Domain contains all instantiated components and resources at one or several resource provision points in the network.

3. The system of claim 1, wherein the Provision Session Layer includes provision session related components: a Provision Coordinator, a Provision Coordinator Factory, and a Resource Provision Controller, wherein the provision coordinator coordinates low level physical resources;

the Provision Coordinator Factory is configured to create provision coordinator object instance; and the Provision Coordinator Factory provides individual interface for each type of resources separately; if necessary, the Provision Coordinator Factory can continue to manage the provision coordinator objects it generated;

the Resource Provision Controller is used to control and manage a variety of low-level resources; the Provision Coordinator instantiates individual Resource Provision Controller upon each resource-provision request; the Resource Provision Controller contacts with Resource, applies and uses physical resource to establish actual binding of resource point.

4. A computer implemented system including at least one computer processor for executing a mapping system of mapping logical point-of-delivery to physical point-of-delivery for cloud computing resource management in enterprise data center, wherein the mapping system is executed in a service delivery platform according to a new Telecommunication Information Networking Architecture (TINA)-variation architecture;

a service target of the TINA-variation architecture is an enterprise data center;

the TINA-variation architecture includes an Access Session Layer, a Service Session Layer, a Resource Session Layer, and a Provision Session Layer;

the TINA-variation architecture is left-right asymmetrical;

physical resources of the TINA-variation architecture include IT resources, storage resources, and network resources;

the service delivery platform is used by a project developer, a project operator, an application user, and a system operator;

wherein the service delivery platform includes a Project Delivery Service Network, a Project Logical Environment Service Network, a Project Logical Environment Storage Network, a Project Logical Environment Resource Network, a Virtual Resource Network, and a Data Center Physical Resource Service Network Divided by Project;

the Project Delivery Service Network includes a Project Core Service, a Project Design Service, a Project Delivery Scheduling, and a Project Subscription Service;

the Project Logical Environment Service Network includes multiple sets of offline-projects' and online-projects' logical point-of-delivery, in which the project-delivery-and-scheduling function supports automatic or manual offline-online environment switching, and supports scheduling multiple sets of projects' point-of-delivery;

the Project Logical Environment Storage Network includes multiple sets of offline-project instances' point-of-delivery;

the Project Logical Environment Resource Network includes multiple sets of online-project instances' point-of-delivery;

the Virtual Resource Network in which virtual resources aggregate physical resources of different configurations and different locations, is configured to achieve resource consolidation regardless of type and deployment of the physical resources; wherein the virtual resource network includes unallocated and allocated virtual resources and the Virtual Resource Network provides support of exclusive holding or sharing virtual resources;

the Data Center Physical Resource Service Network Divided by Project includes multiple sets of physical point-of-delivery; the Data Center Physical Resource Service Network Divided by Project supports subscription and commitment of the point-of-delivery, and supports sharing physical resources by space or by time; and the Data Center Physical Resource Service Network Divided by Project includes unallocated and allocated physical resources;

wherein the Service Session Layer includes service session related components: a Service Session Project Operator, a Services Session Application User, a Service Factory, a Service Session Manager, an Operator Service Session Manager, and an Application User Session Manager; wherein the Service Session Project Operator is a project-operator-related service component, and acts as a concrete service endpoint; through some proper interface, the Service Session Project Operator allows a project operator to access to the Operator Service Session Manager; the Service Session Project Operator also supports general service session control capabilities; for each service session involving this component, it will interact with the Operator Service Session Manager;

the Services Session Application User is an application-user-related service component, and acts as a concrete service endpoint; through some proper interface, the Services Session Application User allows an application user to access to the User Service Session Manager; the Services Session Application User also supports general service session control capabilities; for each service session involving this component, it will interact with the User Service Session Manager;

the Service Factory is a specific-service-related service component, and is used to create an object instance upon the request from Developer-Operator Agent or User Agent; if an application user requests to create an instance, it must have an interface being able to access to the service facility, and it shall send a proper request, the Service Factory of multi-service type provides individual interfaces for each type of the services separately; if necessary, the Service Factory can continue to manage the service component it generated;

the Service Session Manager is used in service session control; the Service Session Manager supports service capabilities shared by multiple application users in the session; in a service session, the Service Session Manager supports to track and control virtual resource operations, the Service Session Manager also supports the management capacities related to service session; the Service Session Manager is instantiated by the Service Factory, which generates a Service Session Manager upon request; when a project developer leaves services session or the Service Session Manager is terminated by the Service Factory, the Service Session Manager Instance will be deleted;

the Operator Service Session Manager holds local project-operator-related performance data and information; if an operation only involves local project operator, the Operator Service Session Manager will use its control and management capabilities; otherwise, the Operator Service Session Manager and the Service Session Manager will work together to support the operation; the Operator Service Session Manager is instantiated by the Service Factory, which generates an Operator Service Session Manager upon request; when a project developer leaves the session, the Operator Service Session Manager Instance will be deleted;

the Application User Session Manager holds local application user related performance data and information; if an operation only involves local application user, the Application User Session Manager will use its control and management capabilities; otherwise, the Application User Session Manager and the Service Session Manager will work together to support the operation; the Application User Session Manager is instantiated by the Service Factory, which generates an Application User Session Manager upon request; when an application user leaves the session, the Application User Session Manager Instance will be deleted.

5. A computer implemented system including at least one computer processor for executing a mapping system of mapping logical point-of-delivery to physical point-of-delivery for cloud computing resource management in enterprise data center, wherein the mapping system is executed in a service delivery platform according to a new Telecommunication Information Networking Architecture (TINA)-variation architecture;

a service target of the TINA-variation architecture is an enterprise data center;

the TINA-variation architecture includes an Access Session Layer, a Service Session Layer, a Resource Session Layer, and a Provision Session Layer;

the TINA-variation architecture is left-right asymmetrical;

physical resources of the TINA-variation architecture include IT resources, storage resources, and network resources;

the service delivery platform is used by a project developer, a project operator, an application user, and a system operator;

wherein the service delivery platform includes a Project Delivery Service Network, a Project Logical Environment Service Network, a Project Logical Environment Storage Network, a Project Logical Environment Resource Network, a Virtual Resource Network, and a Data Center Physical Resource Service Network Divided by Project;

the Project Delivery Service Network includes a Project Core Service, a Project Design Service, a Project Delivery Scheduling, and a Project Subscription Service;

the Project Logical Environment Service Network includes multiple sets of offline-projects' and online-projects' logical point-of-delivery, in which the project-delivery-and-scheduling function supports automatic or manual offline-online environment switching, and supports scheduling multiple sets of projects' point-of-delivery;

the Project Logical Environment Storage Network includes multiple sets of offline-project instances' point-of-delivery;

the Project Logical Environment Resource Network includes multiple sets of online-project instances' point-of-delivery;

the Virtual Resource Network in which virtual resources aggregate physical resources of different configurations and different locations, is configured to achieve resource consolidation regardless of type and deployment of the physical resources; wherein the virtual resource network includes unallocated and allocated virtual resources and the Virtual Resource Network provides support of exclusive holding or sharing virtual resources;

the Data Center Physical Resource Service Network Divided by Project includes multiple sets of physical point-of-delivery; the Data Center Physical Resource Service Network Divided by Project supports subscription and commitment of the point-of-delivery, and supports sharing physical resources by space or by time; and the Data Center Physical Resource Service Network Divided by Project includes unallocated and allocated physical resources;

wherein the Resource Session Layer includes a resource session related component: a Resource Session Manager; wherein the Resource Session Manager manages end-to-end resource provision, provides an interface which allows the User Service Session Manager, the Operator Service Session Manager Session Manager to create, modify, and delete end-to-end resource provision.

* * * * *